No. 770,807.

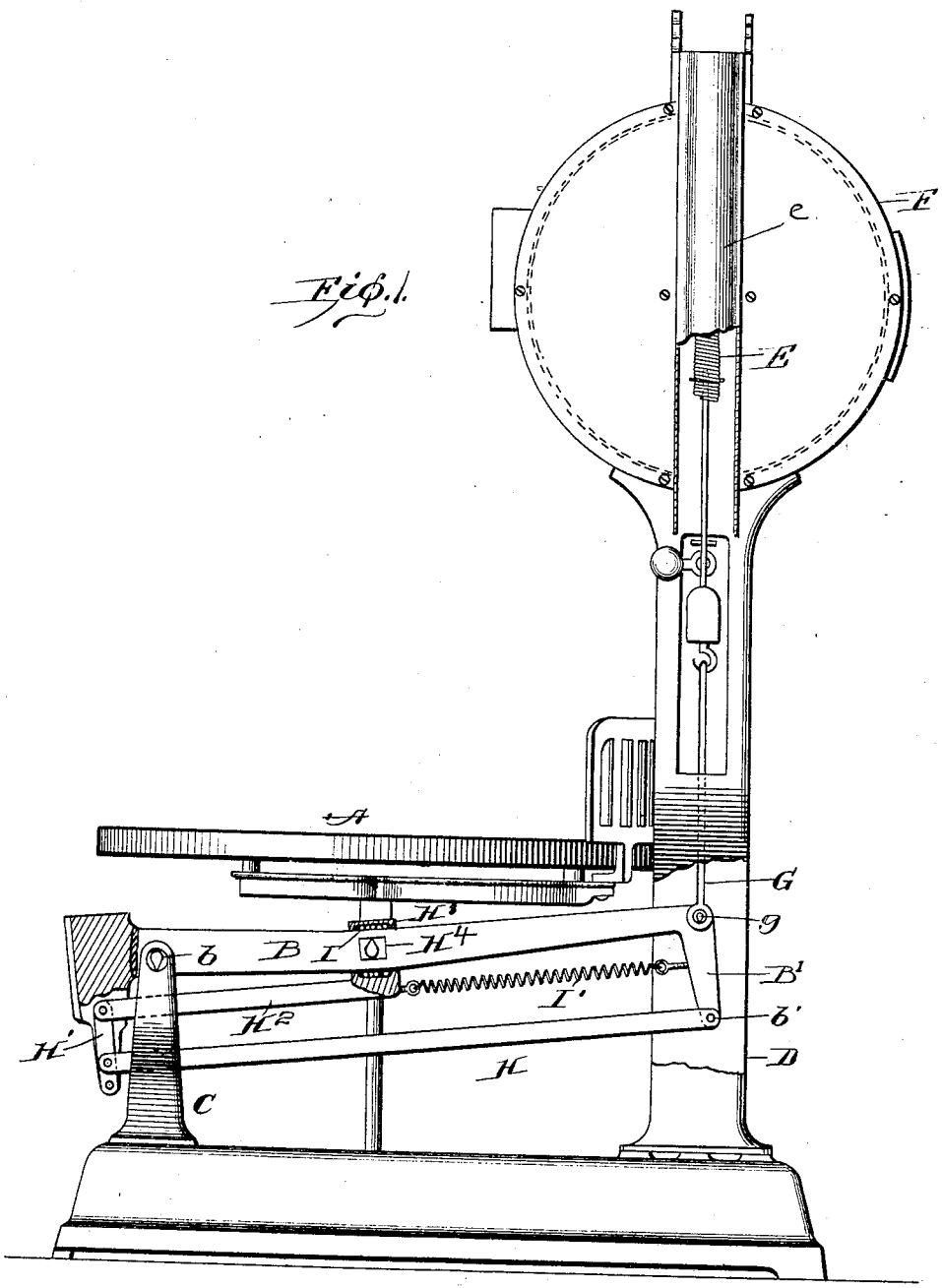

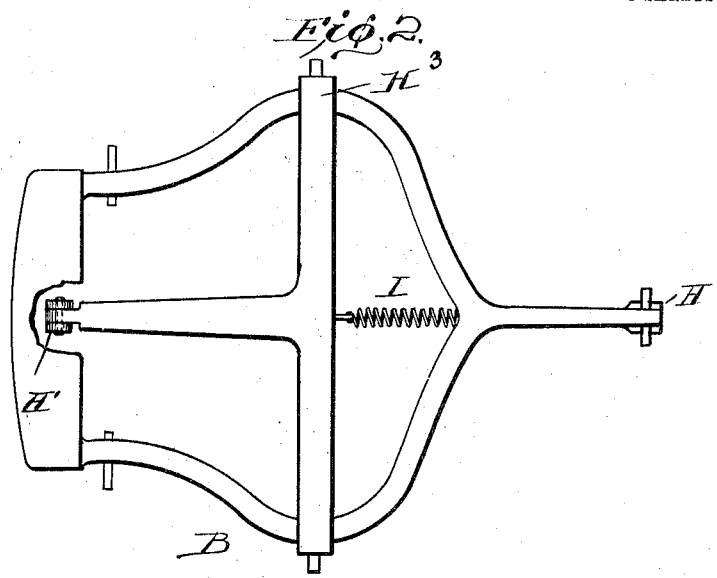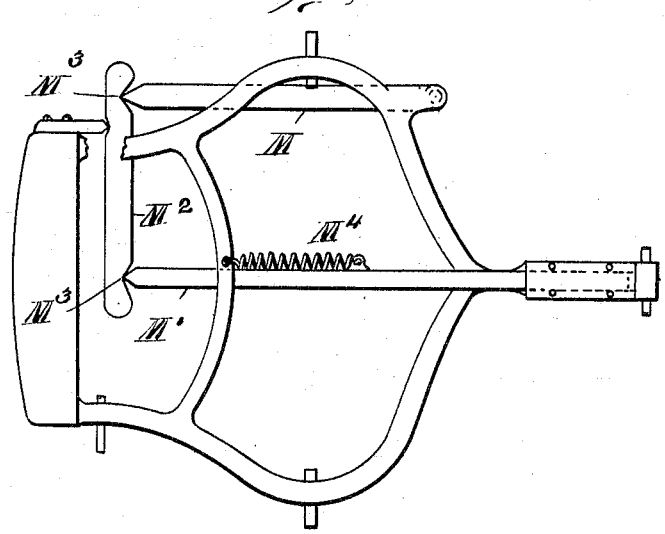

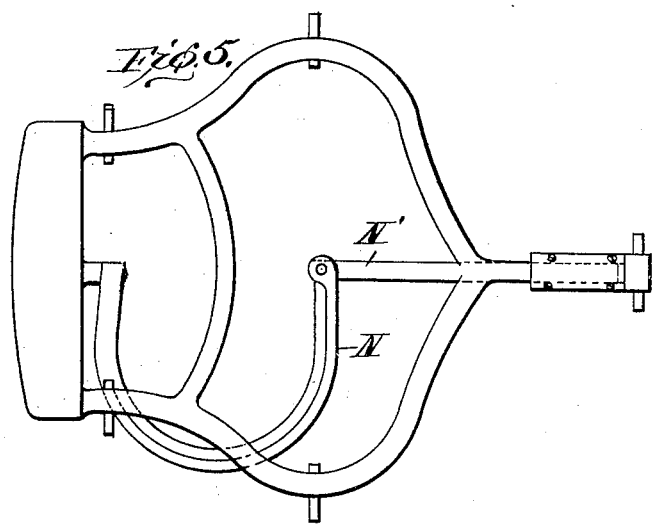
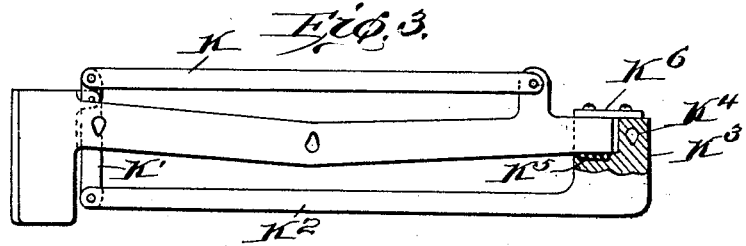
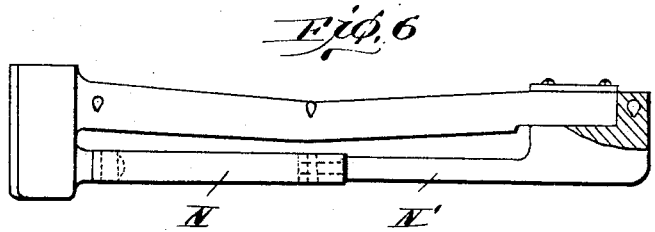

Patented September 27, 1904.

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

SCALE.

SPECIFICATION forming part of Letters Patent No. 770,807, dated September 27, 1904.

Application filed June 3, 1903. Serial No. 159,942. (No model.)

*To all whom it may concern:*

Be it known that I, JOSEPH HOPKINSON, a citizen of the United States, residing at Dayton, in the county of Montgomery and State of Ohio, have invented certain new and useful Improvements in Scales; and I do hereby declare the following to be a full, clear, and exact description of the same, reference being had to the accompanying drawings, forming a part of this specification, and to the letters of reference marked thereon.

This invention relates to improvements in weighing-scales, the object of the invention being to overcome inaccuracies due to changes in temperature and which in scales as ordinarily constructed result in false indications save when the temperature is the particular temperature to which the scale is adjusted. The inaccuracies are most manifest in scales wherein the counterbalancing means is a spring or springs, and while the present invention is especially applicable to this type of scales it is not intended that it shall be limited thereto save when so specified.
Referring to the accompanying drawings, Figure 1 is a side elevation of a scale with portions broken away to show how the present invention is embodied therein. Fig. 2 is a top plan view of the platform-lever, showing the application of the thermostatic mechanism thereto. Fig. 3 is a side elevation of a platform-lever with a portion broken away and showing a modified arrangement of the thermostatic mechanism. Fig. 4 is a top plan view of a platform-lever, showing another arrangement of the parts. Fig. 5 is a top plan, and Fig. 6 is a side elevation showing still another arrangement of the parts.

Similar letters of reference in the several figures denote the same parts.

The scale illustrated is adopted as a characteristic type of scale to which the invention may be applied in its simplest form, and in said scale the goods are placed on a platform or receiver A, supported on knife-edge bearings carried by a platform-lever B, pivoted at $b$ on a base C.

Extending up from the base is a frame, preferably formed by standards D, adapted to support the counterbalancing mechanism, which consists in the particular scale illustrated of springs E, located in housings $e$ at each end of a casing F, which latter is adapted to contain the indicating mechanism. The springs and indicating mechanism are connected with the platform-lever through a draft-rod G, engaging knife-edges $g$ on the end of the platform-lever.

To neutralize or compensate for the effects of variations in temperature, the effective leverage of the platform-lever is varied by varying the distance between the pivots supporting the platform or goods-receiver and the pivots through which the counterbalancing mechanism is connected with the platform-lever. The shifting of the pivots with respect to each other is effected by a thermostat with suitable mechanical connections, the specific arrangement of which may vary considerably without departing from the invention.

In Fig. 1 the platform-lever has a thermostatic bar H connected thereto at one end, preferably by a pivotal connection $h$ at the lower end of an extension B'. The opposite end of the thermostat is pivotally connected with a lever H', pivoted on the platform-lever near its opposite end, the longer arm of the lever H' being pivotally connected with a second thermostat bar $H^2$, the end of which directly engages a bearing $H^3$, carrying the pivots for the platform and adapted to slide on the platform-lever. To bring the knife-edges into proper alinement with the other bearings on the lever, an opening or slot $H^4$ is preferably formed through the lever and against the straight upper surface of which the knife-edge of the platform-pivot may bear, if so desired, although it is preferable that ball-bearings I be interposed between the bearing $H^3$ and the platform-lever. In order to take up any possible wear or lost motion in the pivot connections, a spring I' is preferably provided for keeping the thermostat connections under tension in one direction; but inasmuch as the thermostatic bars act by direct thrust or pull the spring will not influence the same to an appreciable extent. The thermostat-bars are preferably zinc or a metal having a high coefficient of expansion by increase in temperature, and it will be apparent to those skilled in the art after an understanding of the before-described arrangement of the parts that such parts may be differently arranged and constructed and still accomplish the same ends. For instance, the knife-edges or bearings for the draft connection may be shifted, mechanisms for accomplishing this end being shown in Figs. 3 to 6, inclusive.

In Fig. 3 the thermostat-bar K connects at one end with the platform-lever and at the opposite end with a cross-lever K', pivoted on the platform-lever and having its longer arm connected with a second thermostat-bar $K^2$, extending forwardly and coöperating with a bearing $K^3$, mounted to slide on the forward end of the platform-lever. This bearing supports the knife-edge pivots $K^4$ for the draft connection, as in the former instance a ball-bearing is preferably interposed between the bearing $K^3$ and the lever; but as the strain is all in one direction the balls $K^5$ need only be located on the under side of the lever, a cover-plate $K^6$ serving to retain the parts in position and to facilitate construction and assembling.

In Figs. 4, 5, and 6 practically the same arrangement of the bearing for the knife-edge pivots of the draft connection is adopted; but in Fig. 4 the thermostat-bars M and M', together with the intermediate lever $M^2$, are arranged in substantially the same plane beneath the platform-lever, and the pivoted connections or bearings for these parts are knife-edge or point bearings $M^3$. A spring $M^4$ is employed to hold the engaging points in proper position and to maintain a tension in one direction, so as to avoid lost motion, the tension of the spring being ordinarily sufficient to hold the parts in position when the scale is in use.

In Figs. 5 and 6 a curved or horseshoe thermostat N, formed of plates of metal having different coefficients of expansion, is employed, one end of the thermostat being connected directly to the platform-lever and the other end to the extension N' of the bearing for the pivots of the draft connection. Obviously this extension may be a zinc bar to give a somewhat wider range of movement to the bearing. By shifting the pivots or points of attachment of the goods-receiver and draft-bar with relation to each other as described the effective leverage of the platform-lever may be varied to compensate for the variations in the counterbalancing mechanism due to changes in temperature. Thus where springs constitute the counterbalancing mechanism and will yield to a greater extent under a given load at high temperature, and vice versa, the effective leverage of the platform-lever is increased or reduced, as the case may be, and to a degree which will cause a given load to influence the indicating mechanism uniformly at all temperatures. By arranging the thermostatic bars on the platform-lever to operate or expand and contract in opposite direction changes in the balance of the platform-lever itself are prevented, as the parts may be so proportioned that the weight of the parts movable toward the fulcrum of the lever will compensate for the weight of the parts movable in the opposite direction.

What I claim as my invention is—

1. In a combined spring and lever scale, a spring, a lever connected thereto and having pivots, one of which is movable lengthwise of said lever to change the leverage thereof, a carrier upon which said movable pivot is mounted, indicating mechanism, a thermostat affected by variations in the temperature of the surrounding atmosphere, and connections between said thermostat and said carrier whereby the movements of the thermostat due to the variation of the temperature are transmitted to said carrier to compensate, in the indicating mechanism, for any variation in the tension of the spring due to variation in the surrounding atmospheric temperature.

2. In a combined spring and lever scale, a lever having pivots, one of which is movable lengthwise of said lever, a carrier mounted on said lever and to which said pivot is attached, a thermostat, a multiplying-lever pivotally connected to said thermostat, and connections between said multiplying-lever and the carrier through which the movements imparted to the thermostat through variations in atmospheric temperature, are transmitted to said carrier to change the leverage of the scale and thus compensate for any variation in the tension of the scale-spring due to changes in the temperature of the surrounding atmosphere.

3. In a scale, the combination with the goods-receiver, and the counterbalancing mechanism, of a lever interposed between the goods-receiver and counterbalancing mechanism and a thermostat on said lever and moving therewith for varying the effective leverage of the lever in transmitting the weight of the goods to the counterbalancing mechanism; substantially as described.

4. In a scale, the combination with the goods-receiver and the counterbalancing mechanism, of a lever interposed between the goods-receiver and counterbalancing mechanism a fixed fulcrum for said lever and means for varying the relative position of the points of attachment of the goods-receiver and the counterbalancing mechanism to compensate for the effect of variations in temperature on the counterbalancing mechanism; substantially as described.

5. In a scale, the combination with the goods-receiver and the counterbalancing mechanism, of a lever interposed between the goods-receiver and counterbalancing mechanism, a fixed fulcrum for said lever, and a thermostat mounted on the lever for varying the points of attachment of the goods-receiver and the counterbalancing mechanism with relation to each other to compensate for the effect of variations in temperature on the counterbalancing mechanism; substantially as described.

6. In a scale the combination with a goods-receiver, a lever supporting the goods-receiver mounted on a fixed fulcrum, and a counterbalancing-spring connected with the lever the points of attachment of the goods-receiver and counterbalancing-spring being movable with relation to each other, of a thermostat including a thermostatic bar for automatically changing the relative positions of said points, said thermostat being mounted on the lever and embodying a means whereby the movement of the thermostatic bar is augmented; substantially as described.

7. In a scale, the combination with a goods-receiver, a lever on which the goods-receiver is supported and a counterbalancing-spring connected with the lever, of a thermostat mounted on the lever for varying the relative positions of the points of attachment of the goods-receiver and spring and embodying oppositely-moving parts whereby the balance of the lever is maintained approximately uniform; substantially as described.

8. In a scale, the combination with the goods-receiver, a lever on which the goods-receiver is supported and a counterbalancing-spring connected with the lever, of a thermostat mounted on the lever for varying the relative positions of the points of attachment of the goods-receiver and spring and embodying pivotally-connected parts and a spring for holding said parts under tension in one direction to prevent lost motion; substantially as described.

9. In a scale the combination with the goods-receiver, and a counterbalancing-spring therefor of a thermostat for compensating for the effect of variation in temperature on said spring and embodying bars pivotally connected with each other and a spring for holding the parts under tension in one direction to prevent lost motion; substantially as described.

10. In a scale, the combination with the goods-receiver, a platform-lever on which it is supported and a counterbalancing-spring connected with the platform-lever, of thermostatic bars mounted on the platform-lever and connected together by a lever, one of said bars being attached to the platform-lever and the other to a bearing movable on the platform-lever to vary the effective leverage of the same; substantially as described.

11. In a scale, the combination with the goods-receiver, the platform-lever on which it is movably mounted, and a counterbalancing-spring connected with the platform-lever, of a thermostat mounted on the lever and connected therewith at one end and with the platform-bearing at the opposite end; substantially as described.

12. In a scale, the combination with the goods-receiver, the platform-lever the counterbalancing-spring and knife-edge pivots for the platform and spring connections with the lever, the pivots for one of said connections, being carried by a bearing movable on the lever with respect to the other, whereby the effective leverage of the platform-lever may be varied, of a thermostat mounted on the platform-lever, connected therewith at one end and with the said bearing at the opposite end; substantially as described.

13. In a scale, the combination with the goods-receiver, the platform-lever, the counterbalancing-spring and knife-edge pivots for the platform and spring connections with the lever, the knife-edge pivots for one of said connections being carried by a bearing movable on the lever with respect to the other, whereby the effective leverage of the platform may be varied, and an antifriction-bearing interposed between said bearing and the lever, of a thermostat connected with said bearing at one end and with the platform-lever at the opposite end; substantially as described.

14. A platform-lever for scales having knife-edge pivots for the fulcrum, load and power respectively, one of said pivots being movable longitudinally of the lever and a thermostat mounted on the lever and connected with the movable pivot to vary the effective leverage of the lever according to changes in temperature; substantially as described.

15. In a scale, the combination with a goods-receiver, a lever supporting the goods-receiver mounted on a fixed fulcrum, and a counterbalancing-spring connected with the lever, the points of attachment of the goods-receiver and counterbalancing-spring being movable with relation to each other, of mechanism for moving the same, including a thermostatic element, said mechanism being mounted on the lever and embodying a means whereby the movement of the thermostatic element is augmented.

16. In a combined spring and lever scale, a spring, a lever connected thereto and having pivots, one of which is movable lengthwise of the lever to change the leverage thereof, a carrier upon which said movable pivot is mounted, indicating mechanism, thermostatic devices affected by the variation in the temperature of the surrounding atmosphere and adapted to transmit movement to said carrier to change the position thereof and thereby compensate, in the indicating mechanism, for any variation in the tension of the spring due to variation in the surrounding atmospheric temperature.

JOSEPH HOPKINSON.

Witnesses:
CHARLES W. JAMES,
O. O. OZOCI.